April 24, 1956  H. N. BROYLES  2,742,704
MATTRESS BORDER MEASURING AND MARKING MACHINES
Filed July 2, 1953  2 Sheets-Sheet 1
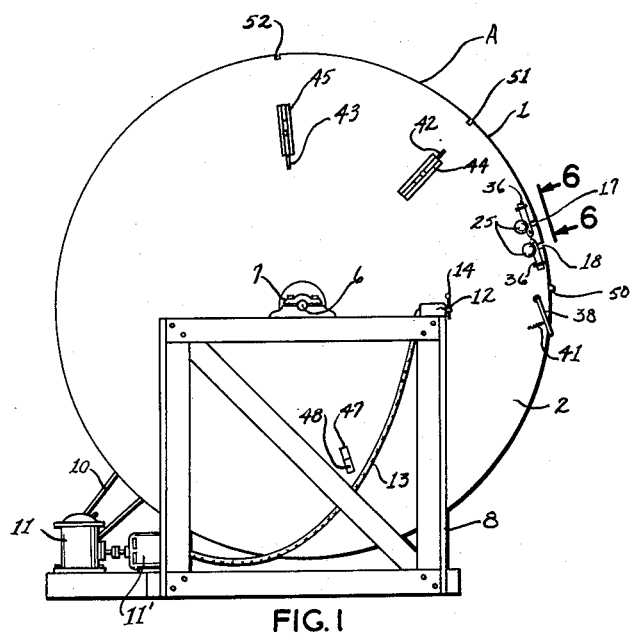
FIG.1
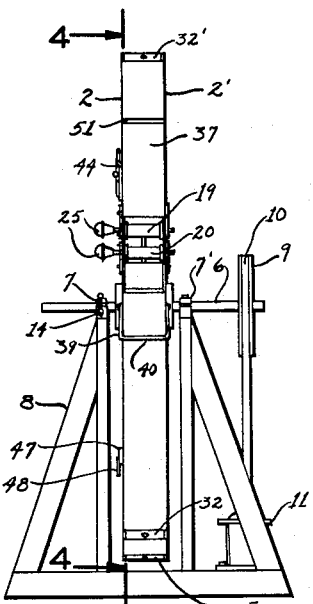
FIG.2
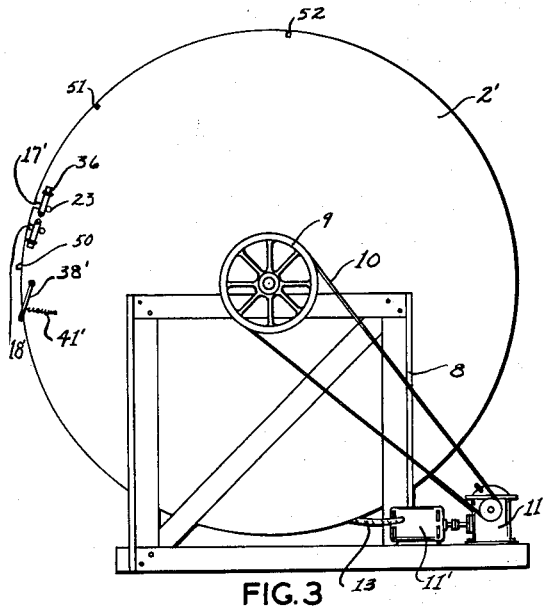
FIG.3
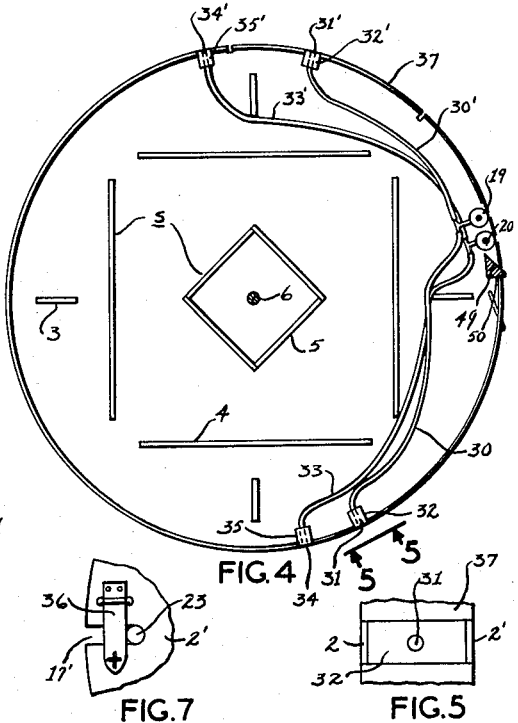
FIG.4
FIG.7
FIG.5
FIG.6
INVENTOR.
HORACE N. BROYLES
BY
ATTORNEY April 24, 1956  H. N. BROYLES  2,742,704
MATTRESS BORDER MEASURING AND MARKING MACHINES
Filed July 2, 1953  2 Sheets-Sheet 2

INVENTOR.
HORACE N. BROYLES
BY Ralph W. Kalish
ATTORNEY

United States Patent Office 2,742,704
Patented Apr. 24, 1956

2,742,704

MATTRESS BORDER MEASURING AND MARKING MACHINES

Horace N. Broyles, St. Louis, Mo.

Application July 2, 1953, Serial No. 365,647

10 Claims. (Cl. 33—132)

This invention relates in general to measuring devices and, more particularly to a machine for measuring mattress borders and marking same for accurate location of ventilator and handle-receiving openings therein.

Mattress borders, which constitute the continuous upstanding end and side portions of mattresses sewn between the opposed upper and lower panels, must be, prior to assembly of the mattress, accurately measured for the particular mattress size desired and must also be marked to guide an operator for punching openings therein at predetermined locations for receiving ventilator caps and handle ends; there being usually two sets of four such openings on each side portion. Heretofore, the border measuring and marking operation has been performed in the following manner: The free end of a roll of border material is led by an operator over a surface of prescribed length, which corresponds to the length of border desired, and at the end thereof the free end is secured as by clamps and the like. The operator will then return to the roll of material and cut same for accurate coincidence with the adjacent end of the measuring surface and secure same appropriately thereon. The operator then returns to the free end and in so doing makes marks in a suitable manner upon the border at specific points thereon as indicated by either adjoining graduations or other indicia provided adjacent the measuring surface. The original free end is then released and the operator then progresses back to the opposite end while loosely gathering the measured and marked border.

As can be readily seen, the foregoing operation requires the operator to walk a distance equivalent to at least four times the length of the border. Since the conventional border lengths are either seven yards or approximately six and one-third yards, a substantial distance will have been traversed by the operator in each measuring operation. A laborious operation of this character is inherently costly from a labor and production standpoint and, furthermore, entails the decided possibility of human error either in the measuring or marking procedure or in both with the possibility thereof becoming increased with the fatiguing of the worker.

After being so marked, the measured border is appropriately placed upon a ventilator and handle-holding machine with a marked portion being disposed intermediate the usual two gangs of four punches each, whereby the two groups of four holes found on each side of a mattress are located.

Therefore, it is the primary object of the present invention to provide a mattress border measuring and marking machine adapted to receive border material from an appropriate source and to operate until the desired length of material has been received whereby an operator may speedily and accurately obtain the requisite length without having to consume time and energy in moving over substantial distances.

It is a further object of the present invention to provide a machine of the character stated which embodies readily operated means for precisely marking a border length received thereon to assure proper location of ventilator and handle holding openings.

It is an additional object of the present invention to provide a machine of the character stated which is adapted for readily measuring and marking borders of varying length whereby the said machine may be utilized for any desired length.

It is a still further object of the present invention to provide a machine for measuring and marking mattress borders which, having a simplicity of parts, is reliable and durable in operation; which may be economically manufactured and installed; and which does not require trained personnel for operation.

These and other detailed objects are obtained by the structure illustrated in the accompanying drawings (two sheets) in which—

Figure 1 is a side elevational view of a mattress measuring and marking machine constructed in accordance with and embodying the present invention;

Figure 2 is an end view;

Figure 3 is a side elevational view;

Figure 4 is a vertical transverse section taken on line 4—4 of Figure 2;

Figure 5 is a fragmentary section taken on line 5—5 of Figure 4;

Figure 6 is an enlarged fragmentary end view illustrating a marking material discharge cylinder;

Figure 7 is a fragmentary side view taken on line 7—7 of Figure 6;

Figure 8:
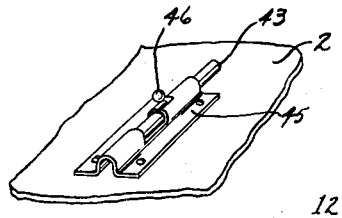
Figure 8 is an enlarged perspective view of a contact arm.

Referring now to the drawings which illustrate a preferred embodiment of the present invention, A designates a mattress border measuring and marking machine comprising a vertically presented, circular frame or wheel 1 having side members 2, 2', fabricated of any suitable material, such as wood and the like and maintained in spaced relation by intermediate support members generally designated s (Figure 4) to which side members 2, 2', are secured, as by screws. Support members s consist preferably of an outer, a middle, and an inner series of four spaced sections, said series being respectively indicated 3, 4, 5, which rigidify wheel 1. Side members 2, 2', are centrally drilled for mounting of wheel 1 upon a shaft 6 for projection therethrough and is journaled in pillow blocks 7, 7', secured upon opposite sides of a support frame 8. On the end of shaft 6, projecting beyond pillow blocks 7', is disposed a pulley 9 about which is trained a drive belt 10 connected to a gear reduction box 11 secured upon the base of support frame 8 and operatively engaged to a motor 11'. Presented on frame 8 forwardly of pillow block 7 for convenient operation is a motor switch unit 12 connected to motor 11' by a cable 13 and having a pivotally mounted operating lever 14 having upper and lower sections 15, 15', with an enlarged head 16 provided at the end of upper section 15; said lever 14 being mounted for effecting operation of motor 11' with consequent rotation of wheel 1 in a counterclockwise direction when in inwardly swung position adjacent side member 2. When lever 14 is disposed in substantially vertical position, motor 11' is not energized and when the upper end of said lever 14 is swung outwardly away from side member 2, motor 11' is reversed with consequent rotation of wheel 1 in a clockwise direction for purposes described more fully hereinbelow.

Side members 2, 2', are each provided with a pair of aligned narrow recesses 17, 18, and 17', 18', respectively, for extension therebetween of cylinders 19, 20 (Figures 2 and 6), each of which is provided with end caps 21, 22. End caps 21 are provided with a central opening closable by an elongated bolt 23 which is supported within recess 17', 18', as the case may be, and which projects beyond side member 2'. End caps 22 are similarly provided with a central opening and receive therethrough a tube 24 which is supported within recess 17, 18, as the case may be, and on its outer projecting end mounts a conventional bulb 25. The inner portion of tubes 24 project into their associated cylinders 19, 20, being axially aligned therewith, and are provided with a plurality of peripherally spaced perforations 26 for emission of air upon compression of bulbs 25. Projecting into each cylinder 19, 20, through the side wall thereof, and substantially intermediate their length, is an outlet tube 27 forming an arm of a T fitting 28 (Figure 6); said outlet tube 27 having a plurality of openings 29 on its portion projecting into cylinders 19, 20. Upon the other arms of T fitting 28 associated with cylinder 19 are engaged flexible piping branches 30, 30', made preferably of rubber, plastic, and the like, which progress between the side members 2, 2', for connection to outlet openings 31, 31', respectively drilled in block members 32, 32', secured to, and extending between side members 2, 2', at predetermined points adjacent the periphery thereof so that outlet openings 31, 31', are presented for radial discharge. Similarly, there are engaged upon the T fitting 28 associated with cylinder 20, flexible piping branches 33, 33', which are connected at their opposite ends to outlet openings 34, 34', respectively, formed in block members 35, 35', respectively, positioned at selected points adjacent the periphery of side members 2, 2'.

Provided within each cylinder 19, 20, is a supply of a suitable marking material, such as a powder, indicated $p$, which upon compression of bulbs 25 is impelled by air through T fittings 28 and along the various piping sections 30, 30', 33, 33', for discharge through the outlets 31, 31', 34, 34', for reasons more fully described hereinbelow. It has been found preferable that cylinders 19, 20, contain marking material of different colors so that the discharge associated with openings 31, 31', will be readily visually distinguished from a discharge through openings 34, 34'.

To prevent inadvertent displacement of cylinders 19, 20, from machine A during operation, there are provided on each side member 2, 2', hingedly mounted hasps 36 for extension across recesses 17, 17', 18, 18', being detachably engageable in such position (Figures 6 and 7).

The space between side members 2, 2', is desirably enclosed by a peripheral surface-forming member 37 having suitable openings for blocks 32, 32', 35, 35', and cylinders 19, 20. Swingably engaged upon side members 2, 2', at the ends of its side arms 38, 38', is a U-shaped or bail-like clamp member 39 having a transverse arm 40 which extends across peripheral member 37. Secured to side members 2, 2', and side arms 38, 38', respectively, of clamp members 39 are extension springs 41, 41', for biasing transverse arm 40 against peripheral member 37.

Suitably mounted on the outer face of side member 2 is a pair of spaced contact arms 42, 43, being of general bolt design, disposed within keepers 44, 45, respectively, for slidable movement radially toward and away from the center of side member 2.

Each contact arm 42, 43, is provided with an enlarged knob 46 for optional latching engagement within suitable notches provided in keepers 44, 45, for maintaining contact arms 42, 43, in either inwardly projected or operative position, as shown by contact arm 43 in Figure 1, or in outwardly projecting or inoperative position, as illustrated by contact arm 42, in Figure 1. With contact arms 42, 43, in inwardly projected or operative position, the same will engage the enlarged head 16 of motor operating lever 14 when the same is in so-called "on" position, as shown in full lines in Figure 9, whereby upon such engagement the operating lever 14 will be caused to swing outwardly into "off" position. With contact arms 42, 43, in outwardly projecting or inoperative position, no contact will, of course, be made with operating lever 14. Thus, by the selected use of contact arms 42, 43, the rotation of cylinder 1 may be controlled as will be developed hereinbelow.

Also mounted on the outer face of side member 2 is a block 47 carrying a contact member 48 fabricated of leather or the like projecting radially toward the periphery of side member 2 for engagement with the end of the lower section 15' of operating lever 14 when said lever 14 is in motor reversing position, with such engagement causing lever 14 to be returningly rocked to motor "off" position.

Extending between side members 2, 2', being secured at its ends thereto, substantially intermediate transverse arm 40 and cylinders 19, 20, is a bar 49 which projects beyond the periphery of said side members 2, 2', to present an abutment surface 50 directed toward transverse arm 40. Peripheral member 37 is provided with slot-like openings 51, 52, spaced apart through a predetermined arc and on the opposite side of cylinders 19, 20, as bar 49.

Figure 11:
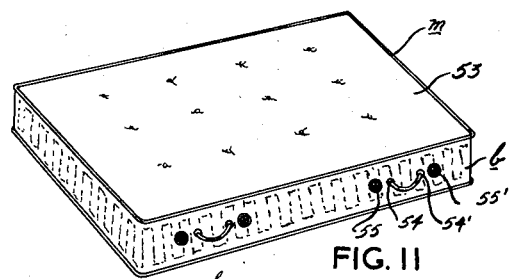
Figure 11 is a perspective view of a mattress showing the handles and ventilator caps mounted thereon.
Figure 12:
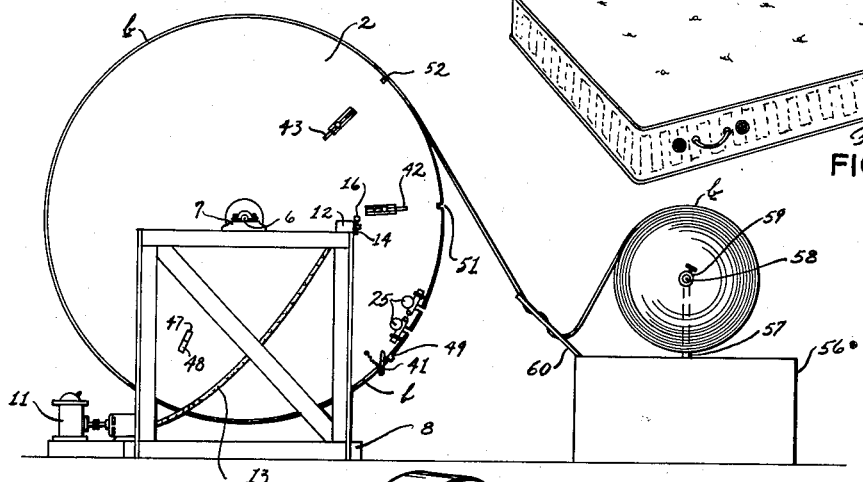
Figure 12 is a side view illustrating border material fed onto the machine from a supply stand.
Figure 13:
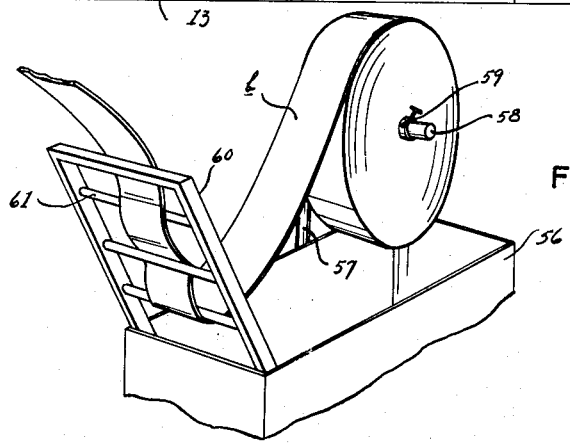
Figure 13 is a fragmentary perspective view of the border material supply stand.

Although mattress borders may be of any length desired, primarily two sizes thereof are customarily used with the width of the mattress to be made indicating the particular length desired. The two most popular mattress widths are 3¼ feet or so-called 3/3 and 4½ feet or, as known in the industry, 4/6. The over all length of a mattress border of the 4/6 size is approximately 7 yards while that of the 3/3 size is about 6⅓ yards. Due to the differences in length it is requisite that the ventilator and handle-holding openings be properly located on each. Figure 11 illustrates a fully formed mattress $m$ having a top panel 53, a border $b$ with two sets of four openings spacedly presented on the lateral margin of border $b$, each set having a pair of handle-holding openings 54, 54', and ventilator openings 55, 55', outwardly of said handle holding openings 54, 54', respectively.

As presented herein, machine A is adapted to properly measure and mark for location of the aforesaid openings, border lengths of the so-called 3/3 and 4/6 sizes. The border material $b$ to be measured and marked may be fed to machine A by any suitable means such as from a supply stand 56 located adjacent machine A and having an upright 57 with a cross arm 58 at the upper end thereof freely mounting the roll of border material $b$ with a collar member 59 preventing inadvertent lateral displacement of the roll of border material $b$. At the forward end of supply stand 56 there may be presented an inclined frame 60 having a plurality of spaced transverse rollers 61 about which the free end of the border material $b$ is alternatingly led.

Figure 9:
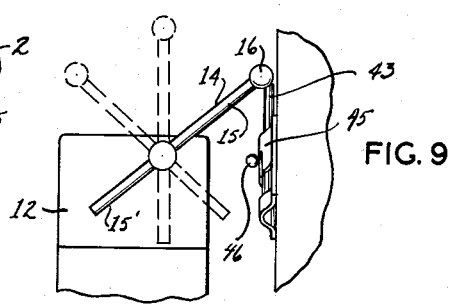
Figure 9 is an enlarged fragmentary view of the motor operating lever and a contact arm in engaged relation.

The measuring and marking operation is as follows: The clamp member 39 is swung upwardly and the free end of the border material $b$ is placed against peripheral member 37 with the edge of the free end against abutment surface 50 whereupon clamp 39 is released for holding material against peripheral member 37. If the operator desires to measure and mark a border of the 3/3 size, contact arm 43 is moved to operative or inwardly presented position, as shown in Figures 1 and 9, and contact arm 42 is placed in outwardly presented or inoperative position. The operator then rocks lever 14 inwardly toward side member 2 for energizing motor 11' with consequent rotation of wheel 1 in counter-clockwise direction. As wheel 1 rotates, border material is automatically dispensed from the supply roll in covering disposition on peripheral member 37. This rotation will continue until contact arm 43 engages the enlarged head of operating lever 14 (Figure 9) whereupon same is rocked into "off" position. It will thus be seen that contact arm 43 is so positioned as to assure that wheel 1 will rotate through an arc of sufficient degree to assure that the necessary amount of border material for a 3/3 border has been dispensed. With the wheel 1 now stationary, the operator by means of any suitable cutting implement, such as a scissors, will sever the border coincident with slot 52 whereupon a border of the so-called 3/3 size is accurately provided.

Figure 10:
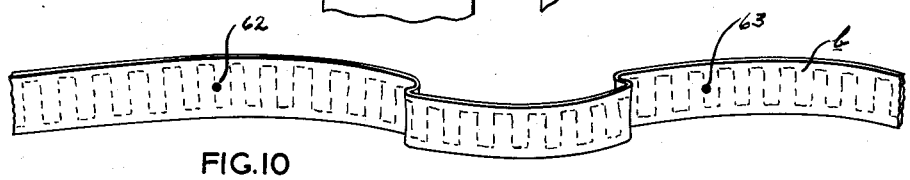
Figure 10 is a perspective view of a marked mattress border.

To properly mark the so measured border the operator will compress bulb 25 associated with cylinder 19 whereupon marking material will be discharged through openings 34, 34', and on to border b, as at points 62, 63, indicated in Figure 10. With the border b thus measured and marked, the operator will swing operating lever 14 outwardly to energize motor 11' for operation in reverse direction whereupon wheel 1 will be rotated in a clockwise direction to cause the border b to be discharged therefrom for collection in any desirable manner such as in a receptacle or in the arms of an operator. The clockwise rotation will be terminated by engagement of contact member 48 with lower section 15' of operating lever 14. Clamp 39 is then swung outwardly to free measured and marked border b. It is apparent that the marking operation may precede the cutting operation, if desired, and with relatively short lengths of material it is preferable that it does precede whereby the material will be properly held for marking.

For placing the openings 54, 54', 55, 55', in the marked border b the operator will position same upon the bed of a conventional ventilator and handle-holding punching machine with one of the marks 62 or 63 intermediate the customary two gangs of four punches. Upon actuation of such machine, the two sets of four holes will be accurately located for one side of the mattress. Thus, the operation is performed twice for each border b, with first one mark and then the other serving as a guide.

If a border of the 4/6 size is desired, contact arm 42 is placed in operative position and contact arm 43 is withdrawn, to assure that sufficient counter-clockwise rotation of wheel 1 will be effected to allow the desired length of border b to be fed thereon from the supply roll. In severing a border of this length, the operator will use slot 51 as a cutting guide. For marking the 4/6 border, the operator will compress bulb 25 associated with cylinder 20 so that the marking material will be discharged through openings 31, 31'. As indicated hereinabove, it has been found preferable that different color marking material be utilized so that, for example, red marks be used on 3/3 borders and blue marks on 4/6 borders, in order that during subsequent mattress-forming operations, an operator can readily determine the border size by checking the marking color.

The measuring and marking operation effected by this invention requires about one fourth of the time requisite for similar operation heretofore, and does not necessitate any travel of the operator. Thus, production and labor costs are measurably reduced by the use of this invention, and, furthermore, the possibility of error is substantially eliminated.

It is obvious that machine A may be readily adapted for border lengths of any desired extent and having any selected number of openings.

The details of construction can be varied without departing from the spirit of the invention and the exclusive use of those modifications coming within the scope of the claims contemplated.

What is claimed is:

1. A flexible material measuring and marking machine comprising a circular frame adapted for rotation about its axis, said frame having a material-receiving peripheral surface, clamping means provided on said frame for engaging material received on said peripheral surface, means for rotating said frame, selector means for effecting termination of rotation of the circular frame after it has traveled through an arc equivalent to the length of material desired, and material marking means provided on said frame.

2. A flexible material measuring and marking machine comprising a circular frame adapted for rotation about its axis, said frame having a material-receiving peripheral surface, clamping means provided on said frame for engaging material received on said peripheral surface, means for rotating said frame including an operating switch, a contact arm presented on said frame for optionally engaging said switch for terminating rotation of said frame after it has traveled through an arc equivalent to the length of material desired, and material marking means provided on said frame.

3. A flexible material measuring and marking machine comprising a circular frame adapted for rotation about its axis, said frame having a material-receiving peripheral surface, clamping means provided on said frame for engaging material received on said peripheral surface, means for rotating said frame, selector means for effecting termination of rotation of the circular frame after it has traveled through an arc equivalent to the length of material desired, and material marking means provided on said frame including discharge ports at predetermined points on said peripheral surface and a material expelling member connected thereto.

4. A flexible material measuring and marking machine comprising a circular frame adapted for rotation about its axis, said frame having a material-receiving peripheral surface, clamping means provided on said frame for engaging material received on said peripheral surface, means for rotating said frame including an operating switch, a contact arm presented on said frame for optionally engaging said switch for terminating rotation of said frame after it has traveled through an arc equivalent to the length of material desired, and material marking means provided on said frame including discharge ports at predetermined points on said peripheral surface and a material expelling member connected thereto.

5. A flexible material measuring and marking machine comprising a support frame, a circular frame mounted on said support frame for rotation about its axis, means for rotating said circular frame, said circular frame having a peripheral surface for receiving material thereon as the circular frame is rotated in one direction, clamping means provided on a clamping member mounted on said circular frame for extension across the peripheral surface to engage material received thereon, selector means for effecting termination of rotation of the circular frame after it has traveled through an arc equivalent to the length of material desired, a reservoir for material marking matter mounted on said frame, and an expelling member connected to said reservoir, said peripheral surface having marking matter outlet ports at predetermined points, said ports being connected to said reservoir.

6. A flexible material measuring and marking machine of the type described in claim 5 wherein a cutting guide is provided on the peripheral surface of the circular frame for indicating one end of the desired material length.

7. A flexible material measuring and marking machine of the type described in claim 5 wherein said means for rotating said circular frame comprise a switch member adapted for rocking movement toward and away from said circular frame, and said selector means comprise a contact arm movably mounted on said frame for optionally engaging said switch to terminate rotation of said circular frame.

8. In a flexible material measuring and marking machine a rotatably mounted circular frame adapted for receiving material upon its peripheral surface, a material marking matter reservoir mounted on said frame, and an air-operated expelling member connected to said reservoir, said peripheral surface of the circular frame having at least one marking matter outlet port therein, said port being connected to said reservoir by a conduit.

9. In a flexible material measuring and marking machine comprising a support frame, an upright circular frame mounted on said support frame for rotation about its axis, means for rotating said frame, said circular frame having a peripheral surface for receiving material thereon as the circular frame is rotated in one direction, a clamping member mounted on said circular frame for extension across the peripheral surface to engage material received thereon, selector means for effecting termination of rotation of the circular frame after it has traveled through an arc equivalent to the length of material desired, and a cutting guide provided on said peripheral surface for indicating one end of the selected material length.

10. A material measuring and marking machine comprising a support frame, a vertically presented circular frame mounted on said support frame for rotation about its axis, means for rotating said circular frame, said circular frame having a peripheral surface for receiving thereon flexible material fed from the source of same, a clamping member resiliently mounted on said circular frame for extension across the peripheral surface thereof to engage one end of material fed thereto, abutment means provided on said circular frame adjacent the clamping member for abutment thereagainst of said end margin of material fed to the machine, cutting guide means provided on said peripheral surface for indicating the end of the desired length of material, selector means for effecting termination of rotation of the circular frame after it has moved through an arc equivalent to the length of material to be measured, a plurality of outlet ports provided at predetermined points in said peripheral surface, a source of material marking matter provided on said frame, and an air-operated marking matter expelling member connected to said source of marking matter, said outlet ports being connected to said source of marking matter whereby upon operation of the expelling member marking matter will be expelled through the outlet ports for marking the material received upon the peripheral surface at spaced points.

References Cited in the file of this patent
UNITED STATES PATENTS

| | | |
|---|---|---|
| 1,169,130 | Curtis | Jan. 25, 1916 |
| 1,270,251 | Smith | June 18, 1918 |
| 2,171,667 | Mickelson et al. | Sept. 5, 1939 |
| 2,295,542 | Breth | Sept. 15, 1942 |